United States Patent [19]
Linker

[11] 3,944,153
[45] Mar. 16, 1976

[54] SPINDLE AND LATCH
[75] Inventor: Elliott C. Linker, Irvine, Calif.
[73] Assignee: Electronic Engineering Co. of California, Santa Ana, Calif.
[22] Filed: Mar. 19, 1975
[21] Appl. No.: 560,004

[52] U.S. Cl............................ 242/68.3; 403/330
[51] Int. Cl.².................................. B65H 17/02
[58] Field of Search ...... 242/68.3, 71.8 A; 403/322, 403/327, 328, 330; 85/3 S

[56]     References Cited
        UNITED STATES PATENTS
| | | | |
|---|---|---|---|
| 1,041,184 | 10/1912 | Spiro | 242/68.3 |
| 1,179,924 | 4/1916 | Howell | 242/68.3 |
| 2,882,078 | 4/1959 | MacDonald | 242/68.3 X |
| 3,275,257 | 9/1966 | Cherniavskyj | 242/71.8 A |
| 3,330,494 | 7/1967 | Rissberger | 242/71.8 A |
| 3,359,020 | 12/1967 | O'Donnell | 242/68.3 X |

Primary Examiner—Edward J. McCarthy
Attorney, Agent, or Firm—Harry R. Lubcke

[57] ABSTRACT

A spindle and latch combination for removably retaining a reel. Keys drive the reel. Oppositely, a slot in the spindle holds the latch and a spring there urges the latch against the reel. Engagement or disengagement of the reel and spindle by one hand is possible. The latch may be embodied to pivot inboard or outboard of the reel.

9 Claims, 4 Drawing Figures

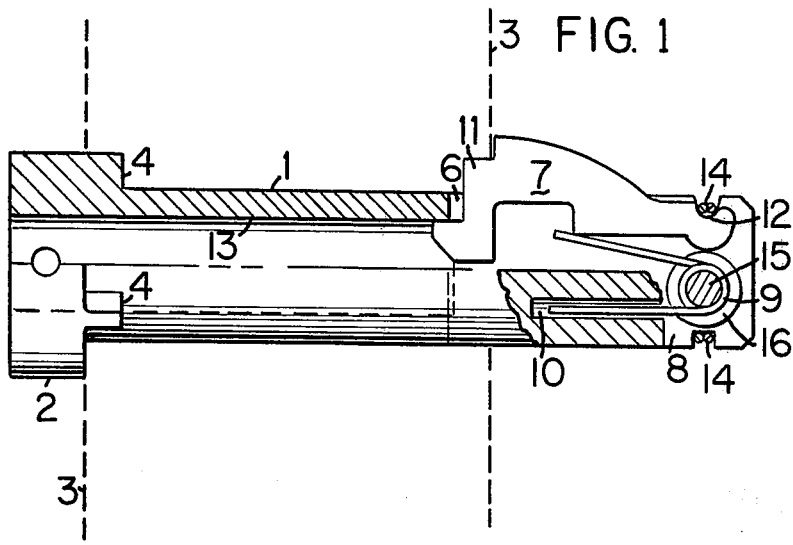
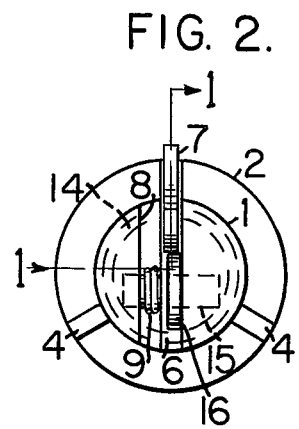
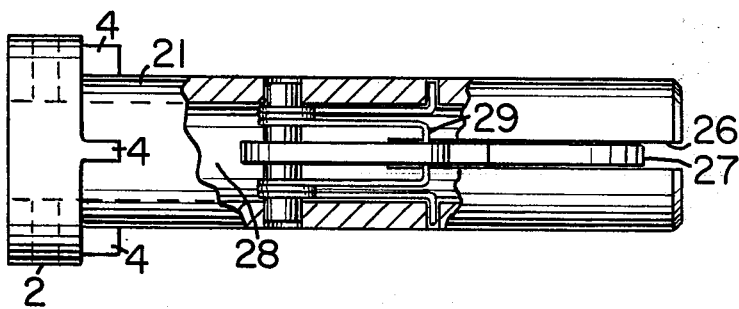
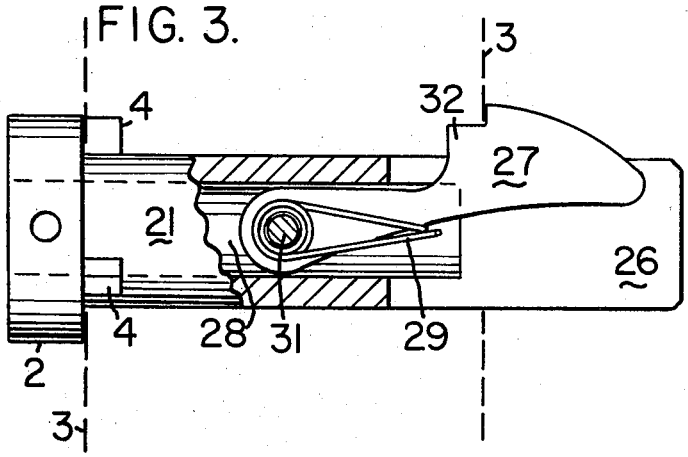

SPINDLE AND LATCH

BACKGROUND OF THE INVENTION

This invention pertains to spindles and latching means associated therewith.

A simple spindle with an "over-center" tongue at one extremity has long been known for removably supporting reels in theatrical motion picture equipment.

With the advent of magnetic tape for recording and reproducing electrical variations, another generation of spindles for detatchably mounting a reel came into being. These frequently employed large hubs for the "spindle" and multiple resiliently-mounted latches.

With the coming of Super 8 mm film and the larger hole size in the reel for the same, a number of compound spindles have been evolved, capable of selectively driving either the new film or the prior standard 8 mm film.

Insofar as latching is concerned, the known over-center tongue has been used. Also, spindles of small size and an adapter sleeve that may be either placed upon or removed from the small spindle, or remains a part of it to prevent loss, have been used.

A shaped spring within the small spindle, having a projection at each of two extremities for retaining either the reel or the sleeve upon the small spindle has been used. The projecting part of the spring is moved into the hollow shaft by manual force when the reel or sleeve is moved into place upon the shaft.

SUMMARY OF THE INVENTION

A relatively simple spindle and latch, locking a reel to a spindle for rotational driving thereby, and by simple finger manipulation to allow the reel to slide off of the spindle. In order to retain a valid structure despite very large accelerations and decelerations of starting and stopping, as is characteristic of paper tape apparatus, a plurality of radially-extending keys, not merely pins, are formed into a flange at the inner end of the spindle. This should be by cold heading, or by machining from a single piece of metal.

At the outer end of the spindle a spring latch is positioned so that the reel is secured between the keys and the latch. The latch has a particular configuration to engage the reel. It may be fulcrumed at the end of the spindle or at an intermediate point along the length.

A torsion spring is nested in the longitudinal slot holding the latch, with one end thereof bearing upon the latch and the other end anchored to the spindle to provide the spring force to keep the latch closed against the reel.

At a tape reading speed of 750 characters per second, with random stops and starts as required in computer service, prior art spindles were destroyed as to the function of driving the reels with tape after 10 stops. The present invention spindle was effective for 24,000 stops and starts under the same conditions.

BRIEF DESCRIPTION OF THE DRAWINGS

FIG. 1 is a side elevation, partly in section along lines 1—1 in FIG. 2, of an assembled spindle and latch according to this invention.

FIG. 2 is an end view of the same.

FIG. 3 is a side elevation of an alternate embodiment of the spindle and latch, partly in section along a vertical diameter.

FIG. 4 is a plan view of the same, partly in section along a horizontal diameter.

DESCRIPTION OF THE PREFERRED EMBODIMENTS

In FIGS. 1 and 2, numeral 1 indicates the cylindrical spindle. This may have a variety of sizes and proportions, but to accommodate a standard paper tape reel, for instance, it is one half inch (1.27 cm) in diameter by 2.16 inches (5.5 cm) long, from flange 2 to the end.

Flange 2 provides a needed surface against which one side of the inner portion of the reel, shown fragmentarily and dotted at 3, can be butressed. The flange also carries plural, typically three, rectangular keys 4, which fully occupy corresponding slots in the reel. An axial bore 13 is typically provided within the flange end of spindle 1 to allow a shaft (not shown) to enter the spindle in the usual manner.

Slot 6 extends from the end of the spindle opposite to that occupied by the flange along a diameter and to approximately the center of the spindle, longitudinally. It has a width only slightly greater than the thickness of latch 7, to therefore provide a nesting support for the latch.

In addition, there is a wider part 8 to the slot. This part extends from the free end of the spindle along only a small fraction of the length of the spindle. It provides a space for spring 9, which spring is held in place by axle 15.

The spring may conveniently be a coiled spring of approximately three turns, having both ends extending tangentially away from the coil. The lower end in FIG. 1 enters small hole 10 in the body of the spindle beyond the longitudinal extent of slot 8. The upper end lies against the under side of latch 7 and provides the force for maintaining it in the upper, or radially outward, position, which is as shown in FIG. 1.

A leaf spring equivalent to spring 9 to urge the latch upward may alternately be used.

A bore coaxial with the spindle may alternately provide space for spring 9, being equivalent to slot 8.

Latch 7 has a stepped configuration at its end toward flange 2. This is to provide an additional radial key at 11, to fit in an additional slot in the right-hand face of reel 3. With the known "two-piece" reel this aids in maintaining the reel unitary under the extreme start and stop stresses by providing driving to both sides of the reel.

The opposite end of the latch is relatively narrow and has a pivot-accepting notch 12. Typically, two turns of a spring wire wrap 14 engages this notch and is otherwise nested in a circumferential slot all the way around the spindle at the location of wrap 14.

Washer 16 is positioned on axle 15 to prevent latch 7 from being depressed in such a way as to disengage notch 12 from retaining ring 14.

The completed structure is used as follows. A reel 3 is merely pushed upon spindle 1 from the free end; at the right in FIG. 1. This action forces latch 7 fully into slot 6 of the spindle, after which the latch moves upward. A slight rotation of the reel upon the spindle may be required to cause the keyways in the hub of the reel mate with keys 4 and 11. Latch 7 then extends fully upward, as shown in FIG. 1.

The simplicity and convenience of merely pushing the reel upon the spindle is an important feature of this invention over the more complicated manipulation of catches and/or other elements required in the prior art.

For removing the reel, latch 7 is merely pushed down sufficiently far with a finger so that the latch lies within slot 6, radially, and the reel is pulled off of the spindle. This can all be accomplished with one hand.

It is to be noted that the pivot point for latch 7 is near the surface of cylindrical spindle 1 and near the free end thereof.

The alternate embodiment of FIGS. 3 and 4 is principally characterized in having the latch fulcrumed at approximately the center of the axial length of the spindle, rather than at the end, as before. Axial bore 28 serves not only to fasten the spindle to a shaft having a smaller diameter, but also to provide suitable housing for spring 29. This spring is similar to spring 9, but is a double-wound torsion spring with right and left handed coils equally disposed about a center portion suitable for actuating latch 27. Spindle 21 has flange 2, keys 4, and a slot 26 diametrically disposed, as before.

Latch 27 is roughly a mirror image of previous latch 7. A modified pivot point is provided relatively central of spindle 21, both longitudinally and radially. A diametrically disposed pin 31 passes through the whole of the spindle and the spring and a hole at substantially the inner end of latch 27 receives the pin also.

In operation the functioning is the same as before. Latch 27 is automatically depressed by a reel being pushed upon spindle 21. Thereafter the latch springs up into reel-securing position, at 32.

The arc of the motion of the latch is merely opposite to the previous arc.

A suitable material for fabricating the spindle and associated parts having sufficient strength for the intended use is 303 stainless steel or equivalent.

A hard aluminum alloy or a hard polyester plastic are possible alternate materials.

I claim:

1. A spindle for removably retaining a reel, comprising;
   a. a cylindrical spindle (1 or 21) having plural radial keys (4) at a common longitudinal position to drive said reel (3), and a longitudinal slot oppositely longitudinally disposed with respect to said keys,
   b. an end-pivoted latch (7 or 27) fitted within said slot (6), and
   c. a spring (9 or 29) engaging said latch and bearing upon said spindle
   to urge said latch radially outward to a limit set by the shape of the latch
   to axially and circumferentially retain said reel upon said spindle.

2. The spindle of claim 1, in which;
   a. said spring is disposed within said slot under said latch, and has a hub colinear with the pivot of said latch.

3. The spindle of claim 2, in which;
   a. said spring is of the torsion type having tangentially extending ends,
   one of which bears upon said latch and the other of which bears upon said spindle,
   with said hub secured to said spindle (15 or 31).

4. The spindle of claim 1, in which;
   a. said latch (7 or 27) has a projection (11 or 32) to engage a keyway in said reel longitudinally opposite to keyways in said reel engaging said keys (4).

5. The spindle of claim 1, in which;
   a. said latch has a fulcrum (12) at the extremity of said latch slot, and the portion of said latch for engaging the reel is disposed toward said keys (4) with respect to said fulcrum.

6. The spindle of claim 5, in which;
   a. said fulcrum is disposed at substantially the surface of said spindle.

7. The spindle of claim 1, in which;
   a. said latch has a linear shape (27), has a fulcrum (31) at an intermediate point in said slot, and the portion (32) of said latch for engaging the reel is wholly disposed away from said keys (4) with respect to said fulcrum.

8. The spindle of claim 7, in which;
   a. said fulcrum (31) is disposed substantially at the center of said spindle, radially.

9. The spindle of claim 1, in which;
   a. said spring (29) is a double-wound torsion spring.

* * * * *